(12) United States Patent
Parlotto (10) Patent No.: US 8,489,478 B2
(45) Date of Patent: Jul. 16, 2013

(54) VIRTUAL TERMINAL FOR PAYMENT PROCESSING

(75) Inventor: Michael Parlotto, Playa Vista, CA (US)

(73) Assignee: e2interactive, Inc., Atlanta, GA (US)

( * ) Notice: Subject to any disclaimer, the term of this patent is extended or adjusted under 35 U.S.C. 154(b) by 263 days.

(21) Appl. No.: 12/798,574

(22) Filed: Apr. 7, 2010

(65) Prior Publication Data

US 2010/0198727 A1  Aug. 5, 2010

Related U.S. Application Data (63) Continuation of application No. 11/521,159, filed on Sep. 14, 2006, now Pat. No. 7,698,220.

(51) Int. Cl.
*G06Q 40/00* (2012.01)
*G06Q 40/02* (2012.01)

(52) U.S. Cl.
CPC ...................................... *G06Q 40/02* (2013.01)
USPC .................. 705/35; 705/40; 705/39; 705/37; 705/38; 705/45; 705/74; 705/22; 705/42; 705/64; 705/79; 235/379

(58) Field of Classification Search
USPC ......... 705/30–45, 74, 79, 22, 64, 16; 235/379
See application file for complete search history.

(56) References Cited

U.S. PATENT DOCUMENTS

| | | | |
|---|---|---|---|
| 4,068,213 A | 1/1978 | Nakamura | |
| 4,482,802 A | 11/1984 | Aizawa | |
| 4,734,858 A | 3/1988 | Schlafly | |
| 4,747,049 A | 5/1988 | Richardson | |
| 4,755,940 A | 7/1988 | Brachtl | |
| 4,877,947 A | 10/1989 | Mori | |
| 4,900,904 A | 2/1990 | Wright | |
| 4,908,521 A | 3/1990 | Boggan | |
| 4,943,707 A | 7/1990 | Boggan | |
| 5,255,182 A | 10/1993 | Adams | |
| 5,384,449 A | 1/1995 | Peirce | |
| 5,477,038 A | 12/1995 | Levine | |
| 5,502,765 A | 3/1996 | Ishiguro | |
| 5,524,073 A | 6/1996 | Stambler | |
| 5,577,109 A | 11/1996 | Stimson | |
| 5,621,201 A | 4/1997 | Langhans | |
| 5,621,787 A | 4/1997 | McKoy | |

(Continued)

FOREIGN PATENT DOCUMENTS

| | | |
|---|---|---|
| GB | 2333878 A | 8/1999 |
| WO | 2004053640 | 6/2004 |

OTHER PUBLICATIONS

Smith, Michelle B., Nova Teams with Prio to Offer Merchants Online Affinity Program, US Web/CKS for Prio 510/530-2036; Phillips Business Information.

Buck, S. Peter, Electronic Commerce—Would, Could, and Should You Use Current Internet Payment Mechanisms? Internet Research, vol. 6, n2/3, pp. 5-18, 1996.

*Primary Examiner* — Tien Nguyen
(74) *Attorney, Agent, or Firm* — Landmark Intellectual Property Law, PC (57) ABSTRACT

In some embodiments, a process for performing transaction tasks using a virtual terminal comprises: presenting functions to a user, receiving a selected function, and performing the selected function. The presented functions may comprise: (a) activating at least one card; (b) deactivating a card; (c) generating a PIN; (d) inserting value; (e) generating an End of Day report; and (f) managing users.

7 Claims, 1 Drawing Sheet

100

U.S. PATENT DOCUMENTS

| | | | |
|---|---|---|---|
| 5,657,389 A | 8/1997 | Houvener |
| 5,679,938 A | 10/1997 | Templeton |
| 5,679,940 A | 10/1997 | Templeton |
| 5,696,909 A | 12/1997 | Wallner |
| 5,828,740 A | 10/1998 | Khuc |
| 5,889,863 A | 3/1999 | Weber |
| 5,930,363 A | 7/1999 | Stanford |
| 5,945,653 A | 8/1999 | Walker |
| 5,987,132 A | 11/1999 | Rowney |
| 5,991,413 A | 11/1999 | Arditti |
| 5,999,624 A | 12/1999 | Hopkins |
| 6,000,608 A | 12/1999 | Dorf |
| 6,003,014 A | 12/1999 | Lee |
| 6,012,049 A | 1/2000 | Kawan |
| 6,018,570 A | 1/2000 | Matison |
| 6,018,717 A | 1/2000 | Lee |
| 6,032,859 A | 3/2000 | Muehlberger |
| 6,038,549 A | 3/2000 | Davis |
| 6,058,300 A | 5/2000 | Hanson |
| 6,072,870 A | 6/2000 | Nguyen |
| 6,073,842 A | 6/2000 | Yoshinaga |
| 6,094,643 A | 7/2000 | Anderson |
| 6,098,053 A | 8/2000 | Slater |
| 6,119,105 A | 9/2000 | Williams |
| 6,119,106 A | 9/2000 | Mersky |
| 6,129,275 A | 10/2000 | Urquhart |
| 6,158,657 A | 12/2000 | Hall |
| 6,163,843 A | 12/2000 | Inoue |
| 6,169,975 B1 | 1/2001 | White |
| 6,185,545 B1 | 2/2001 | Resnick |
| 6,189,787 B1 | 2/2001 | Dorf |
| 6,190,256 B1 | 2/2001 | Walker |
| 6,202,933 B1 | 3/2001 | Poore |
| 6,215,999 B1 | 4/2001 | Dorenbosch |
| 6,220,511 B1 | 4/2001 | Holer |
| 6,226,624 B1 | 5/2001 | Watson |
| 6,237,023 B1 | 5/2001 | Yoshimoto |
| 6,253,027 B1 | 6/2001 | Weber |
| 6,256,690 B1 | 7/2001 | Carper |
| 6,282,566 B1 * | 8/2001 | Lee et al. ............... 709/217 |
| 6,295,522 B1 | 9/2001 | Boesch |
| 6,298,336 B1 | 10/2001 | Davis |
| 6,302,326 B1 | 10/2001 | Symonds |
| 6,304,915 B1 | 10/2001 | Nguyen |
| 6,308,887 B1 | 10/2001 | Korman |
| 6,311,165 B1 | 10/2001 | Coutts |
| 6,315,195 B1 | 11/2001 | Ramachandran |
| 6,324,525 B1 | 11/2001 | Kramer |
| 6,330,544 B1 | 12/2001 | Walker |
| 6,332,135 B1 | 12/2001 | Conklin |
| 6,333,976 B2 | 12/2001 | Lesley |
| 6,381,631 B1 | 4/2002 | Van Hoff |
| 6,404,869 B1 * | 6/2002 | Henderson et al. ...... 379/144.01 |
| 6,405,182 B1 | 6/2002 | Cuervo |
| 6,424,706 B1 | 7/2002 | Katz |
| 6,434,238 B1 | 8/2002 | Chaum |
| 6,445,780 B1 | 9/2002 | Rosset |
| 6,467,684 B2 | 10/2002 | Fite |
| 6,473,500 B1 | 10/2002 | Risafi |
| 6,502,745 B1 | 1/2003 | Stimson |
| 6,575,361 B1 * | 6/2003 | Graves et al. ............... 235/380 |
| 6,581,827 B2 | 6/2003 | Welton |
| 6,612,487 B2 | 9/2003 | Tidball |
| 6,625,438 B2 | 9/2003 | Hanson |
| 6,648,222 B2 | 11/2003 | McDonald et al. |
| 6,651,885 B1 | 11/2003 | Arias |
| 6,659,259 B2 | 12/2003 | Knox |
| 6,714,918 B2 | 3/2004 | Hillmer |
| 6,745,022 B2 | 6/2004 | Knox |
| 6,820,802 B2 | 11/2004 | Biggar et al. |
| 6,827,260 B2 | 12/2004 | Stoutenburg |
| 6,837,426 B2 | 1/2005 | Tidball |
| 6,852,031 B1 * | 2/2005 | Rowe ............... 463/29 |
| 6,918,537 B2 | 7/2005 | Graves |
| 7,024,174 B2 | 4/2006 | Nagy |
| 7,028,891 B2 | 4/2006 | O'Neal |
| 7,054,842 B2 * | 5/2006 | James et al. ............... 705/64 |
| 7,083,084 B2 | 8/2006 | Graves |
| 7,086,584 B2 | 8/2006 | Stoutenburg |
| 7,093,761 B2 | 8/2006 | Smith |
| 7,096,003 B2 | 8/2006 | Joao |
| 7,131,582 B2 | 11/2006 | Welton |
| 7,168,615 B2 | 1/2007 | Smith |
| 7,249,054 B2 | 7/2007 | Keil |
| 7,292,998 B2 | 11/2007 | Graves |
| 7,293,704 B2 | 11/2007 | Smith |
| 7,311,249 B2 | 12/2007 | Smith |
| 7,333,955 B2 | 2/2008 | Graves |
| 7,363,265 B2 | 4/2008 | Horgan |
| 7,483,862 B1 | 1/2009 | Robinson |
| 7,580,859 B2 | 8/2009 | Economy |
| 2001/0032878 A1 | 10/2001 | Tsiounis |
| 2001/0042784 A1 | 11/2001 | Fite |
| 2002/0016749 A1 | 2/2002 | Borecki |
| 2002/0025797 A1 | 2/2002 | Joao |
| 2002/0077076 A1 | 6/2002 | Suryanarayana |
| 2002/0169623 A1 | 11/2002 | Call |
| 2003/0001005 A1 | 1/2003 | Risafi |
| 2003/0014360 A1 | 1/2003 | Arditti |
| 2003/0028481 A1 | 2/2003 | Flitcroft et al. |
| 2003/0033246 A1 | 2/2003 | Slater |
| 2003/0038175 A1 | 2/2003 | Welton |
| 2003/0046249 A1 * | 3/2003 | Wu ............... 705/79 |
| 2003/0055782 A1 | 3/2003 | Slater |
| 2003/0061113 A1 | 3/2003 | Petrovich |
| 2003/0061157 A1 | 3/2003 | Hirka |
| 2003/0105672 A1 | 6/2003 | Epstein |
| 2003/0144909 A1 | 7/2003 | Flaherty |
| 2003/0144910 A1 * | 7/2003 | Flaherty et al. ............... 705/22 |
| 2003/0144935 A1 | 7/2003 | Sobek |
| 2003/0172031 A1 | 9/2003 | Graves |
| 2004/0039702 A1 | 2/2004 | Blair |
| 2004/0049427 A1 | 3/2004 | Tami |
| 2004/0054587 A1 | 3/2004 | Dev |
| 2004/0114766 A1 * | 6/2004 | Hileman et al. ............... 380/278 |
| 2004/0118914 A1 * | 6/2004 | Smith et al. ............... 235/380 |
| 2004/0129777 A1 * | 7/2004 | Smith ............... 235/380 |
| 2004/0133511 A1 | 7/2004 | Smith |
| 2004/0153402 A1 * | 8/2004 | Smith et al. ............... 705/39 |
| 2004/0167821 A1 | 8/2004 | Baumgartner |
| 2004/0181453 A1 | 9/2004 | Ray |
| 2004/0205023 A1 | 10/2004 | Hafer |
| 2004/0210519 A1 | 10/2004 | Oppenlander |
| 2004/0215564 A1 | 10/2004 | Lawlor |
| 2004/0215573 A1 | 10/2004 | Teutenberg |
| 2004/0230489 A1 | 11/2004 | Goldthwaite |
| 2004/0230536 A1 * | 11/2004 | Fung et al. ............... 705/64 |
| 2004/0267663 A1 | 12/2004 | Karns |
| 2005/0027655 A1 | 2/2005 | Sharma |
| 2005/0033645 A1 * | 2/2005 | Duphily ............... 705/16 |
| 2005/0038714 A1 | 2/2005 | Bonet |
| 2005/0051619 A1 | 3/2005 | Graves |
| 2005/0060248 A1 | 3/2005 | O'Neal |
| 2005/0061872 A1 | 3/2005 | Paschini |
| 2005/0080678 A1 | 4/2005 | Economy |
| 2005/0108096 A1 | 5/2005 | Burger |
| 2005/0125288 A1 | 6/2005 | Fou |
| 2005/0127169 A1 | 6/2005 | Foss |
| 2005/0131815 A1 | 6/2005 | Fung |
| 2005/0143051 A1 | 6/2005 | Park |
| 2005/0182678 A1 | 8/2005 | Walker |
| 2005/0182720 A1 | 8/2005 | Willard |
| 2005/0228720 A1 | 10/2005 | Pavlic et al. |
| 2005/0263587 A1 | 12/2005 | Martinez |
| 2005/0278216 A1 | 12/2005 | Graved |
| 2006/0161490 A1 * | 7/2006 | Chakiris et al. ............... 705/35 |
| 2006/0163343 A1 * | 7/2006 | Changryeol ............... 235/380 |
| 2006/0249570 A1 * | 11/2006 | Seifert et al. ............... 235/380 |
| 2006/0255125 A1 | 11/2006 | Jennings |
| 2006/0255135 A1 | 11/2006 | Smith |
| 2006/0289621 A1 | 12/2006 | Foss |
| 2007/0005685 A1 * | 1/2007 | Chau et al. ............... 709/203 |
| 2007/0118478 A1 | 5/2007 | Graves |
| 2007/0187490 A1 | 8/2007 | Feldman |
| 2008/0010215 A1 | 1/2008 | Rackley, III |

* cited by examiner

MAIN MENU

1. ACTIVATION ⇨
2. BATCH ACTIVATION ⇨
3. DEACTIVATION ⇨
4. PIN GENERATION ⇨
5. VALUE INSERTION ⇨
6. END OF DAY REPORT ⇨
7. MANAGE USERS ⇨

100

VIRTUAL TERMINAL FOR PAYMENT PROCESSING

CROSS-REFERENCE TO RELATED APPLICATION

The present application is a continuation of U.S. patent application Ser. No. 11/521,159, filed Sep. 14, 2006 now U.S. Pat. No. 7,698,220, which is incorporated herein by reference in its entirety.

FIELD OF THE INVENTION

The present invention relates to field of electronic transactions involving payment cards. In particular, a virtual terminal is disclosed that enables merchants to perform certain transactional tasks without using a dedicated physical merchant terminal.

BACKGROUND OF THE INVENTION

In order to process transactions using encoded cards, stored value cards, and/or credit or debit cards, it is often necessary for merchants to possess and use a physical terminal. Such terminals are often expensive and cumbersome, and may require special connectivity, maintenance, and training. For particular transactions involving stored value cards, such as activation, deactivation, inserting value, and providing reports, dedicated terminals may also be needed.

Thus, there is a need for a method to accomplish many of the same transactional tasks without the need for an expensive, cumbersome terminal.

Generic computer systems are generally readily available and are fairly inexpensive. Such generic computers are typically capable of connecting to networks, such as the internet, and are capable of connecting to particular servers or processors over such networks. Accordingly, it is desirable to utilize a generic computer system to perform functions generally performed by a physical terminal.

The following U.S. patents and U.S. patent applications describe the state of the art: U.S. patent application Ser. Nos. 11/233,704 filed Sep. 23, 2005; 11/237,950 filed Sep. 29, 2005; 11/116,243 filed Apr. 28, 2005; 11/062,249 filed Feb. 18, 2004; 11/232,573 filed Sep. 22, 2005; 11/303,258 filed Dec. 16, 2005; 11/273,874 filed Nov. 15, 2005; and 10/739,301 filed Dec. 19, 2003.

SUMMARY OF THE INVENTION

Aspects of the invention include a process for performing transaction tasks using a virtual terminal comprises: presenting functions to a user, receiving a selected function, and performing the selected function. The presented functions may comprise: (a) activating at least one card; (b) deactivating a card; (c) generating a PIN; (d) inserting value; (e) generating an End of Day report; and (f) managing users.

These and other aspects will become apparent from the following description of the preferred embodiment taken in conjunction with the following drawings, although variations and modifications may be effected without departing from the spirit and scope of the novel concepts of the disclosure.

BRIEF DESCRIPTION OF THE DRAWINGS

The present invention can be more fully understood by reading the following detailed description together with the accompanying drawings, in which like reference indicators are used to designate like elements.

DETAILED DESCRIPTION OF EXEMPLARY EMBODIMENTS

Definitions

As used herein, any term in the singular may be interpreted in the plural, and alternately, any term in the plural may be interpreted to be in the singular. Error messages or other messages throughout these embodiments are illustrative only, and may be replaced by similar appropriate messages.

The term "serial number" is defined broadly as disclosing alphabetic letters (upper or lower), numbers, and other special characters or identification indicia. Further, sets of steps may be reordered, steps may be omitted, and other steps may be inserted.

The term "disclosing" is used throughout the application in an exemplary and non-limiting manner.

The term "graphical user interface" (GUI) is defined broadly as disclosing simple lines of interrogatories without graphical icons. Hardware buttons, touch sensitive screen icons, mouse activated icons, pull down menus, pop up boxes, and text commands all may be used to interact with software modules. For example, "Submit" may be typed onto a command line, or a "Submit" icon may be selected by clicking the icon with a mouse pointer. Voice recognition systems may be used in place of graphical user interfaces.

The term "cards" is defined broadly as disclosing credit cards, debit cards, gift cards, other consumer cards, magnetic stripe based cards, chip based cards, RFID based cards, and other financial data storage systems that may not have the physical form of a card.

The term "personal identification number" (PIN) is defined broadly similarly to "serial number."

The term "universal product code" (UPC) is defined broadly as disclosing similar product codes such as European Article Numbering (EAN).

The term "dollar" is defined broadly as disclosing other international currencies such as the Euro.

Similarly, labels for icons are defined broadly as disclosing similar appropriate labels (for example, "Submit" discloses "Enter" and "Execute").

Error messages are defined broadly as disclosing similar appropriate messages (for example, "The Command Cannot be Obeyed Because Improper Data Has Been Submitted" discloses "Some Required Fields Have Been left blank" and "Please Enter the Required Information"). Sending an error message is defined broadly as disclosing sending a text message, or sending a graphical symbolic message, or routing the user to a separate screen that provides the appropriate error information.

The major functions of the virtual terminal may comprise some or all of the following: activation of a single card, activation of a batch of cards, deactivation, generation of a PIN, deactivation of a PIN, value insertion, reporting, administration, language selection, and velocity checks. A detailed discussion of each of these functions follows below.

Figure 1:
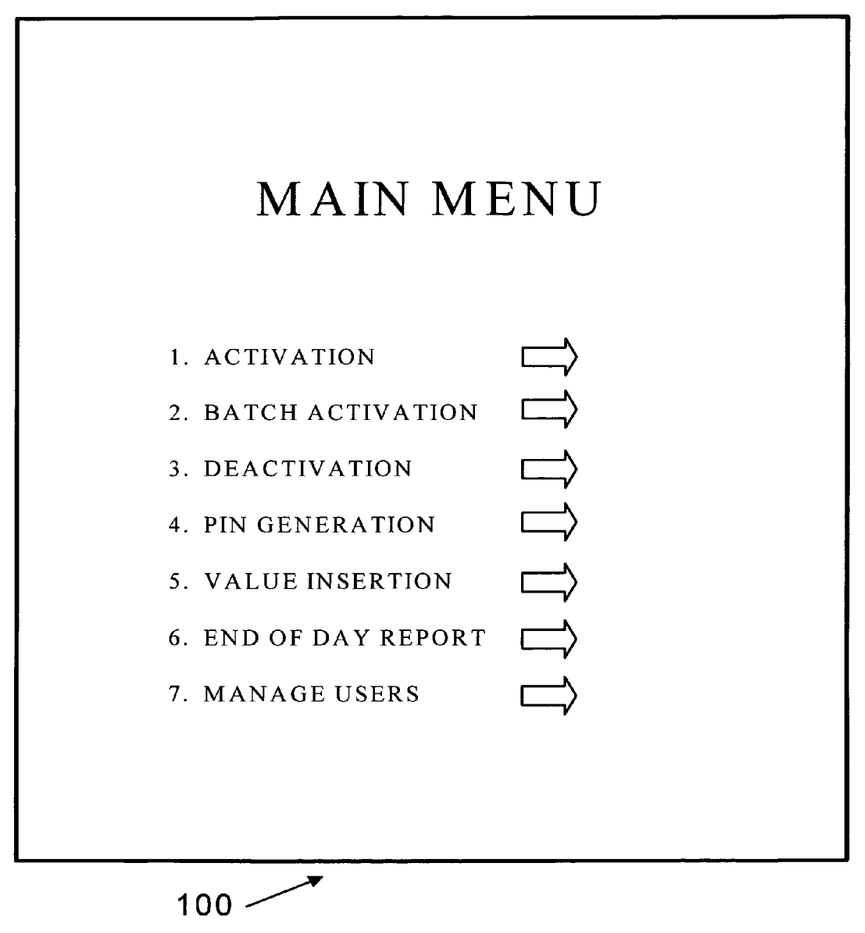
FIG. 1 displays a main menu generated and displayed by a virtual terminal in accordance with some embodiments of the present invention.

FIG. 1 illustrates an embodiment of a main menu presenting the following software modules for selection by a user: activation, batch activation, deactivation, PIN generation, value insertion, End of Day report, and manage users. Specifically, main menu 100 comprises seven software module titles, numbered 1 through 7. The first software module is Activation 1 and is followed by an associated arrow icon. If the associated arrow icon is selected by the user, then the software will send the user to a screen associated with the Activation software module. The other software module titles (Batch Activation 2, and Deactivation 3, and Pin Generation 4, and Value Insertion 5, and End of Day Report 6, and Manage Users 7) are similarly followed by associated arrow icons.

Other interactive navigation techniques are also contemplated, e.g. voice recognition, command line text entry, and so forth. Further, the modules may be reordered, modules may be omitted, and modules may be added.

Activation.

In some embodiments, a virtual terminal may comprise an activation module that may allow a user to activate a stored value card by using a serial number (or personal account number (PAN)) printed on the stored value card. A graphical user interface may request a serial number, or present a field for the serial number. The user may provide the serial number by typing, scanning, RFID communications, importing a file, or by any other convenient method. The user may expressly indicate that the serial number has been provided by selecting a button that is appropriately labeled (for example, "Activate"), or by other well known interface techniques. Alternatively, the virtual terminal may automatically recognize that the serial number has been provided by recognizing that the proper number of digits or characters has been entered. A button or tab designating a return to the main menu or the home page may be provided. Other routing options may be provided.

A graphical user interface module for activation may satisfy one or more of the following requirements:

REQ-1: If the Serial Number is not entered (or is not recognized as a serial number), then the system may display an error message stating that the Serial Number is required. Similar error messages may state that not enough characters were entered, or too many characters were entered, or provide more details.

REQ-2: If the Serial Number entered has already been activated, then the system may display an error message stating "This Serial Number has already been activated. Please check the Serial Number and try again."

REQ-3: If the Serial Number entered has already been redeemed, then the system may display an error message stating that "This Serial Number has already been redeemed and cannot be re-activated. Please check the Serial Number and try again."

REQ-4: If the Serial Number entered belongs to a product that the retailer is not authorized to activate, then the system may display an error message stating that "This retailer is not authorized to activate this product."

REQ-5: If the user enters a Serial Number that is valid, then they may be sent to a page confirming that the Serial Number and product is valid and can be activated.

REQ-6: If the user selects the "Return to Menu" button, then they should be taken to the main Virtual Terminal menu.

REQ-7: A Velocity Check function should monitor the activation of products by each location. If a location exceeds the number of activations allowed per day as listed in the Velocity Threshold table, then the system may display an appropriate error message stating, for example, "You have exceeded your activation limit for the day. Please try again tomorrow, or call our 24-hour Merchant Services support center at 1-800-123-4567."

Batch Activation.

In some embodiments, an activation module may allow the user to simultaneously activate (or at least to present or nominate for activation) a set of cards.

The set may be consecutive or non-consecutive. A consecutive set may be described by a starting serial number and an ending serial number, or may be described by a starting serial number and a total number of cards (for example 100), or by a set of serial numbers (preferably separated by spaces or commas). A non-consecutive set may be input as a set of serial numbers (preferably separated by a space). After identifying a batch of serial numbers, the user may expressly indicate that the batch of serial numbers has been provided by selecting a button that is appropriately labeled (for example, labeled "Activate Batch"), or by other well known interface techniques. A button or tab designating a return to the main menu or the home page may be provided. Other routing options may be provided.

A graphical user interface module for batch activation based on a starting serial number and an ending serial number may satisfy one or more of the following requirements:

REQ-1: If the starting Serial Number is not entered, then the system may display an error stating that the starting Serial Number is required.

REQ-2: If the ending Serial Number is not entered, then the system may display an error stating that the ending Serial Number is required.

REQ-3: If the user enters a range of Serial Numbers that is more than 100 cards, then the system may display an error stating that the user is only able to activate a maximum of 100 cards at a time. (This maximum number of cards may vary from user to user, depending on the status of the user.)

REQ-4: If a Serial Number within the range entered has already been activated, then the system may display an error message listing the serial numbers that could not be activated. An exemplary error message may state "The following Serial Numbers have already been activated. Please check the Serial Number range and try again."

REQ-5: If a Serial Number with the range entered has already been redeemed, then the system may display an error message listing the serial numbers that could not be activated. For example, "The following Serial Numbers have already been redeemed and cannot be re-activated. Please check the Serial Number and try again."

REQ-6: If any of the Serial Numbers within the range entered belong to a product that the retailer is not authorized to activate, then the system may display an error message stating that "This retailer is not authorized to activate this product" and identifying the offending serial numbers and products.

REQ-7: If the user enters a Serial Number range that is valid, then the user may be sent to a page confirming that the Serial Numbers and products are valid and can be activated.

REQ-8: If the user accepts the confirmation, then they may be sent an e-mail to their account on file confirming their batch activation.

REQ-9: If the user selects the "Return to Menu" button, they should be taken to the main Virtual Terminal menu.

REQ-10: A Velocity Check function should monitor the activation of products by each location. If a location exceeds the number of activations allowed per day as listed in the Velocity Threshold table, then the system may display an error message stating "You have exceeded your activation limit for the day. Please try again tomorrow, or call our 24-hour Merchant Services support center at 1-800-123-4567."

Deactivation.

In some embodiments, a virtual terminal may comprise an deactivation module which will allow the user to deactivate a card by using a serial number. This procedure may be similar or analogous to the activation procedure discussed above. Deactivation may be based upon a PIN, in place of a serial number. Batch deactivation may also be allowed, and may be presented on a separate screen, similar to the batch activation discussed above.

A graphical user interface module for deactivation based on serial number or PIN may satisfy one or more of the following requirements:

REQ-1: If neither the Serial Number nor PIN Number is entered, then the system may display an error stating that "Either the Serial Number or PIN Number is required."

REQ-2: If the Serial Number or PIN Number entered has already been deactivated, then the system may display an error message stating that "This Serial Number has already been deactivated. Please check the Serial Number and try again" or "This PIN Number has already been deactivated. Please check the PIN Number and try again."

REQ-3: If the Serial Number or PIN Number entered has already been redeemed, then system may display an error message stating that "This Serial Number has already been redeemed and cannot be deactivated. Please check the Serial Number and try again" or "This PIN Number has already been redeemed and cannot be deactivated. Please check the PIN Number and try again."

REQ-4: If the Serial Number or PIN Number entered belongs to a product that a user is not authorized to deactivate, then the system may display an error message stating that "This user is not authorized to deactivate this product." Generally a user will only be authorized to deactivate the same type of products that the user is authorized to activate, although this is not mandatory.

REQ-5: If the serial number or PIN Number entered was not activated by the user presently logged into the system, then the system may display an error message stating that "This product was not activated by this user, therefore this user is not authorized to deactivate this product." Generally a user will only be allowed to deactivate specific serial numbers or PINs that were activated by the same user, although this is not mandatory.

REQ-6: If the user enters a Serial Number or PIN Number that is valid, then they may be sent to a page confirming that they are about to deactivate this Serial Number or PIN Number.

REQ-7: If the user selects the "Return to Menu" button, then the user should be taken to the main Virtual Terminal menu.

Pin Generation.

In some embodiments, a virtual terminal may comprise a PIN generation module which may allow the user to generate a PIN. The PIN may be for a product that has a UPC (Uniform Product Code), and the UPC may be associated with a UPC description, and the UPC description may include a demonination.

The user may select a product from a UPC pull down menu, and then select a "submit" button.

A graphical user interface module for deactivation based on serial number or PIN may satisfy one or more of the following requirements:

REQ-1: If a product was not selected, then the system may display an error stating that "You must select a product."

REQ-2: If no PINs are available, then the system may display an error stating that "No PINs are available at this time. Please try again later." Additionally, an email notification may be sent to an administrator stating that no PINs are available.

REQ-3: If the user selects a product and a PIN is available for that product, then the user may be sent to a page or screen confirming that they are about to generate a PIN for a specific product.

REQ-4: If the user selects the "Return to Menu" button, then the user should be taken to the main Virtual Terminal menu.

REQ-5: A Terminal Threshold function should monitor the generation of PINs by each location. If a location exceeds the number of PIN generations allowed per day as listed in the Terminal Threshold table, the system will need to display an error message stating "You have exceeded your PIN generation limit for the day. Please try again tomorrow, or call our 24-hour Merchant Services support center at 1-800-123-4567."

Value Insertion.

In some embodiments, a virtual terminal may comprise a value insertion module. The user may add a value to an account. A specific embodiment illustrated below is customized for mobile phones. Similar modules may be customized for paying other kinds of accounts such as household bills (heating, water, cable, etc).

The user may select a product and an associated value from a UPC Description drop down box or menu. Alternatively, an additional box or menu may provide a set of predetermined values as a separate selection. Alternatively, an additional box may allow the user to input any arbitrary value. The user may then enter a mobile phone number, and may also press a "Submit" button or similarly indicate a desire to perform the proposed transaction.

A mobile phone number may be associated with a specific customer account at a specific carrier by accessing a relational database. Thus, a mobile phone number adequately identifies a customer account associated with that mobile phone number. This database may be accessed by an intermediary who holds a subscription, and usually will not be accessed directly by the virtual terminal. In some embodiments, the virtual terminal may never display the identified customer account associated with the mobile phone number.

A graphical user interface module for value insertion may satisfy one or more of the following requirements:

REQ-1: If a product was not selected, then the system may display an error stating that "You must select a product."

REQ-2: If a mobile number was not entered, then the system may display an error message stating that "You must enter a mobile number."

REQ-3: When the user selects Submit, then the system should verify that the mobile number is valid, and is authorized to accept a selected refills. If the mobile number is not valid or is not authorized to accept refills, then an error message may state "The phone number is not valid or is not authorized to accept refills. Please confirm your number and resubmit."

REQ-4: When the user selects Submit, then the system should evaluate the balance of the phone account to determine if the proposed transaction can be competed.

a) If the sum of the account balance and the new value insertion is greater than a predetermined maximum value, then the intermediary may return the code that lets the virtual terminal display the following message: "Adding airtime to this account would exceed the wireless carrier's maximum account balance. We are unable to complete a refill transaction for this account at this time. Please select a smaller amount."

b) If the sum of the account balance and the new value insertion is less than a predetermined maximum value, then the user should be sent to a page or screen confirming that they are about to complete a value insertion for a specific product description, a specific value, and a specific mobile phone number.

REQ-5: If the user selects the "Return to Menu" button, then the user should be taken to the main Virtual Terminal menu.

REQ-6: Carrier specific rules may determine the maximum value for the account after the proposed new value insertion, as discussed above. This maximum value may be taken from a ValueInsertionMaxBalance table.

Generate End of Day Report.

In some embodiments, a virtual terminal may comprise an End of Day Report module. The End of Day Report should contain a concise summary of the transactions and activities of the day. A user may generate a report at the end of the day, or at regular intervals such as the end of each 8 hour shift, or at any specific time.

The user arrives at the current End of Day Report by default. The user may generate or retrieve the Report for a previous day by selecting a date from a calendar pop-up, or by inserting a date into a field. The user may download the report as a file by selecting a "Download Report" button or other interactive means. The user may print a printer-friendly version of the report by selecting a "Print" button. Alternatively, the user may select a "View Printer-friendly Version", and then select a "Print" button.

The End of Day Report should contain a concise summary of the transactions and activities of the day (or of the shift). This summary may include: date, terminal, store number, time, invoice number, a list of prepaid card sales (including transaction date, description, denomination, reference number, employee number, transaction number), a list of PINs issued, and other transactional accounting data.

A graphical user interface module for generating an End of Day Report may satisfy one or more of the following requirements:

REQ-1: If the User selects a previous date from the calendar pop-up, then the page should refresh and display the End of the Day Report for the newly selected date.

REQ-2: The User should not be able to select a future date from the calendar pop-up. The system should make dates that occur after the present day un-selectable.

REQ-3: If the User selects the "Download Report" button, they should be taken to a page that allows them to choose the format of the report to be downloaded. See section 4.5 for more information.

REQ-4: If the User selects the "Print" button, then a page with the printer-friendly version of the report should appear in a new window.

REQ-5: If the User selects the "Return to Menu" button, then the user should be taken back to the main Virtual Terminal menu.

Download Report.

In some embodiments, a virtual terminal may comprise a Download Report module. The End of Day Report may contain a concise summary of the transactions and activities of the day.

A user may download the above mentioned End of Day Report to their computer network, or email it to an interested party. The user may select either the current day's report, or reports in a date range by selecting the appropriate check box. If the User selects a report for a date range, then the User may select the Start Date from the Start Date month, day and year drop down boxes. The User may select the End Date from the End Date month, day and year boxes. The User may select the "Submit" button. The User may select the location on their computer where they wish to place the downloaded report from the pop up Save As window. The User may choose a File Name and enter it in the File Name field in the Save As window. The User may select the "Save" button.

A graphical user interface module for generating an End of Day Report may satisfy one or more of the following requirements:

REQ-1: If the user selects the current day report, and selects the "Submit" button, then a window may pop up prompting them to select a location in which to save the report. The user may save a tab delimited text file containing the current day's data to the selected location.

REQ-2: Under the date range selection option, the Start Date may default to 7 days ago, and the End Date may default to today's date.

REQ-3: If the user selects the date range report, and selects the "Submit" button, a window may pop up prompting the user to select a location in which to save the report. The user may save a tab delimited text file containing the current day's data to the selected location.

Manage Users.

In some embodiments, a virtual terminal may comprise a Manage User's module. The Manage User's module may allow the management of a particular location to add, or remove, or edit user accounts.

A user may enter a user name in a search field. The user may select an appropriate search label from a drop down box. The drop down box may present the following search labels: all, user name, or name. The User may select "Submit". The user may find and select the user name that they with to edit (or select an edit icon next to the user name). The user may select "Add User" to add a user. The user may select "Delete" to delete a user.

A graphical user interface module for managing users may satisfy one or more of the following requirements:

REQ-1: If the user selects a user name or a pencil edit icon, then the user may be transferred to the "Edit/Add User" screen.

REQ-2: If the user selects an "Add User", then the user may be transferred to the Edit/Add User screen.

REQ-3: If the user selects the delete icon, the system should prompt the user with the message "You are about to delete user "telus234clerk02." Would you like to proceed? YES NO." If the user select YES, then the prompt should close, and the named "user" in question should be deleted from the screen. If the user select NO, then the prompt may close and the screen may remain unchanged.

REQ-5: If the user selects Next (when this option is available), then the next 10 records should be displayed.

REQ-6: If the user selects Previous (when this option is available), then the previous 10 entries should be displayed.

REQ-7: If the user selects First (when this option is available), then the first 10 entries should be displayed.

REQ-8: If the user selects an up arrow in any column, then that column should sort in descending order by first letter.

REQ-9: If the user selects a down arrow in any column, then that column should sort in ascending order by first letter.

REQ-10: The search drop down box should default to All.

REQ-11: If the user selects the Search button without having entered any information in the search field, then the system should return all entries.

REQ-10: If the user enters something in the search field, and selects "User Name" from the drop down box, and selects "Search", then the system should only search the User Name field. The same logic should be followed if the user selects "Name or Franchise" from a drop down box.

REQ-11: This module should only allow management to add, edit, and remove clerk accounts for the location that the using management is assigned to. This module should in no way allow the management to change the components or rights available to the using management.

Add/Edit User Accounts.

In some embodiments, a virtual terminal may comprise an Add/Edit User Accounts module. The Add/Edit User Accounts module may allow the management of a particular location to add, or remove, or edit user accounts (this module is very similar to the Manage Users module discussed above).

The user may enter or alter the user name in the User Name text field. The user may enter or alter the password in the Password text field. The user may enter or alter the password again in the Confirm Password text field. The user may enter or alter the first name in the First Name text field. The user may enter or alter the last name in the Last Name text field. The user may enter or alter the email address if available in the Email Address text field. The user may select (or highlight) the desired locations from the left location box, and then select the right arrow to transfer the desired locations to the right location box. The user may select the appropriate functionality from the left functionality box, and then select the arrow to move them to the right selection box. The user may select or unselect active next to the "Active?" Check box. The user may select Save.

A graphical user interface module for adding/editing user accounts may satisfy one or more of the following requirements:

REQ-1: This section should only allow management to add, edit, and remove clerk accounts for location that they are assigned to. This piece should in no way allow the management to change the components or rights available to that management.

REQ-2: The following fields are required: User Name, Password, Confirm Password, First Name, Last Name, Role(s).

REQ-3: If the user selects Save, then the user should be sent to the User List screen.

REQ-4: If the user selects Save but has not entered the required information, then the module should display an error stating "Please enter the required information."

Main Administration.

In some embodiments, a virtual terminal may comprise a Main Administration module. The Main Administration module may allow Administrators to navigate through the menu system. The Main Administration module may be located in eAdmin.

The user may select links to go to different modules in the menu. For example, the links may comprise: User Administration, Merchant/Location Administration, and Merchant Product Administration.

A graphical user interface module for Main Administration may satisfy some of the following requirements:

REQ-1: If the user selects User Administration, they need to go to the User Administration screens.

REQ-2: If the user selects Merchant/Location Administration, they need to go to the Merchant/Location Administration screens.

REQ-3: If the user selects Merchant Product Administration, they need to go to the Merchant Product Administration screens.

User Administration.

In some embodiments, a virtual terminal may comprise a User Administration module. The User Administration Module may allow Administrators to edit and add users. This module may be located in eAdmin.

The User may enter a user name, name, or franchise in the Search field. The User may select an appropriate search label from a drop down box (all, user name, name, or merchant/location). The User may select "Submit". The User may find and select the user name (or select an edit icon next to the user name) that the User wishes to edit. The User may select "Add User" to add a user. The User may select the "Delete" icon to delete a user. The User may change the user's location by selecting "Choose Loc".

A graphical user interface module for User Administration may satisfy some of the following requirements:

REQ-1: If the user selects the user name or the pencil edit icon, then the user should be sent to the Edit/Add User module.

REQ-2: If the user selects Add User, then the user should be sent to the Select User Location screen and should be prompted to drill down to the location. Alternatively or additionally, there should be an option to add an administrative user not associated with a location.

REQ-3: If the user selects the delete icon, then the system should prompt the user with the message "You are about to delete user "telus234clerk02." Would you like to proceed? YES NO." If the user selects YES, then the prompt should close and the selected user should be removed from the screen. If the user selects NO, then the prompt should close and the screen should remain unchanged.

REQ-4: If the user selects Choose Location, then the user should be sent to the Select User Location screen.

REQ-5: If the user selects Next (when available), then the next 10 records should be displayed.

REQ-6: If the user selects Previous (when available), then the previous 10 entries should be displayed.

REQ-7: If the user selects First (when available), the first 10 entries should be displayed.

REQ-8: If the user selects the up arrow in any column, then that column should sort in descending order by first letter.

REQ-9: If the user selects the down arrow in any column, then that column should sort in ascending order by first letter.

REQ-10: The search drop down box should default to All.

REQ-11: If the user selects the Search button without having entered any information in the search field, then the system should return all entries.

REQ-10: If the user enters something in the search field, and selects User Name from the drop down box, and selects Search, then the system should only search the User Name field. The same logic should be followed if the user selects Name or Franchise from the drop down box.

Add/Edit User.

In some embodiments, a virtual terminal may comprise an Add/Edit User module. An Add/Edit User module may allow Administrators to add or edit users. This module may be located in eAdmin.

The user may enter or alter the user name in the User Name text field. The user may enter or alter the password in the Password text field. The user may enter or alter the password again in the Confirm Password text field. The user may enter or alter the first name in the First Name text field. The user may enter or alter the last name in the Last Name text field. The user may enter or alter the email address if available in the Email Address text field. The user may select the appropriate level of access from the Role(s) multiple selection field. The user may select or unselect active next to the Active? Check box. The user may select Save.

A graphical user interface module for Add/Edit User may satisfy some of the following requirements:

REQ-1: The roles may have the following levels of access:
  Clerk: Activate, Deactivate, Value Insertion, PIN Generation.
  Reporter: Run Daily Report.
  Manager: All of the above.
  Admin: All of the above plus administrative access.
REQ-2: The following fields may be required: User Name, Password, Confirm Password, First Name, Last Name, Role(s).
REQ-3: If the user selects Save, then the user should be sent to the User List screen.
REQ-4: If the user selects Save but has not entered the required information, then the module should display an error message stating "Please enter the required information."

Merchant/Location Administration.

In some embodiments, a virtual terminal may comprise a Merchant/Location Administration module. The Merchant/Location Administration module may allow the Administrators to add and edit merchants and locations. This module may be located in eAdmin.

The User may enter a merchant, vendor, or location in the Search field. The User may select the appropriate search label from the drop down box (all, merchant, vendor, or location). The User may select Submit. The User may find and select the organization they wish to view or edit. The User may select Add Organization to add a new organization. If IP Restricted is true, the User may select the highlighted text in the IP Restricted field to add or edit IP addresses. The User may select Edit/Add Users to go to the list of users belonging to that location.

A graphical user interface module for Merchant/Location Administration may satisfy some of the following requirements:

REQ-1: The search drop down box should default to All.
REQ-2: If the user selects the Search button without having entered any information in the search field, then the system should return all entries, or else search only merchants, vendors, or locations, as selected in the drop down box.
REQ-3: If the user enters something in the search field and selects Merchant from the drop down box, and selects Search, then only organizations of the type MERCHANT should be returned. The same logic should be followed if the user selects Vendor or Location from the drop down box.
REQ-4: If the user selects the up arrow next to the column headers Name, Type, Logo, or IP Restricted, then the appropriate column should be sorted in descending order by first letter.
REQ-5: If the user selects the up arrow next to the column headers Name, Type, Logo, or IP Restricted, then the appropriate column should be sorted in ascending order by first letter.
REQ-6: If the user selects the organization name, then the user should be transferred to a pre-populated Organization Administration Edit form.
REQ-7: If the user selects Add Organization, then the user should be transferred to a blank Organization Administration Edit form.
REQ-8: If the user selects Next (when available), then the next 10 records should be displayed.
REQ-9: If the user selects Previous (when available), then the previous 10 entries should be displayed.
REQ-10: If the user selects First (when available), the first 10 entries should be displayed.
REQ-11: If "IP Restricted"=true, then the text "true" should link to an IP Administration screen for that organization.
REQ-12: If the user selects "true" in the IP Restricted column, they should go to an IP Administration screen for that organization.
REQ-13: If the user selects Edit/Add Users, they should go to a page listing the users assigned to that location.

Organization Administration Edit.

In some embodiments, a virtual terminal may comprise an Organization Administration Edit module. An Organization Administration Edit module may allow the Administrators to add and maintain organizations. This module may be located in eAdmin.

The User may enter the Organization Name. The User may not be required to enter the Vendor ID. The User may enter the Merchant ID. The User may enter the Location ID. The User may enter the name and location of the Logo file. The User may check Password Expires if the password for this organization should expire on a regular basis. If the User checked Password Expires, then the User may enter the number of days after which the password expires in the Password Expires Days field. The User may check IP Restricted. The User may select Save.

A graphical user interface module for Organizational Administration Edit may satisfy some of the following requirements:

REQ-1: The following fields may be required: Organization Name, Vendor ID, Merchant ID, Location ID.
REQ-2: When the user selects Save, then the user should be transferred to the Organization list.
REQ-3: No special characters should be allowed.

IP Address Administration.

In some embodiments, a virtual terminal may comprise an IP Address Administration module. An IP Administration module may allow Administrators to add and maintain IP addresses per for security purposes. This module may be located in eAdmin.

The user may enter an IP address. The user may select an Add button. The user may select an edit icon to edit an IP address. The user may select a delete icon to delete an IP address.

A graphical user interface module for IP Address Administration may satisfy the following requirements:

REQ-1: Each octet of the IP Address should be a number from zero to 255.
REQ-2: If the user attempts to add an IP address that is invalid (i.e.—fields are left blank, or one or more octets are more than 255), then the module should display an error message stating "Not a valid IP Address. Please try again."
REQ-3: When the user enters a valid IP address and clicks Add, then the IP address should be added to list of accepted addresses for that organization.
REQ-4: If the user selects an delete icon next to an IP address, then that address should be removed from the list.
REQ-5: If the user selects an edit icon next to an IP address, that address should be editable.
REQ-6: If the user selects a linked organization name, then the user should be transferred to an edit screen for that organization.

Merchant Product Administration.

In some embodiments, a virtual terminal may comprise a Merchant Product Administration module. A Merchant Product Administration module may allow an Administrator to maintain the products available to each merchant. This module may be located in eAdmin.

The user may select a merchant from a drop down menu. The user may select Submit. Alternatively, the user may submit by double clicking on a merchant from the drop down menu.

A graphical user interface module for Merchant Product Administration may satisfy the following requirements:

REQ-1: If the user selects a merchant and selects Submit, then the user should be transferred to a product list for the selected merchant.

Merchant Product List.

In some embodiments, a virtual terminal may comprise a Merchant Product List module. A Merchant Product List module may allow an Administrator to add and edit products for specific merchants. The user may select a product to be edited. The user may select Add Product. The user may delete a product from the merchant's list.

A graphical user interface module for Merchant Product List may satisfy the following requirements:

REQ-1: If the user selects the "X" icon next to the product name, then the product should be removed from this merchant's allowed products list, but should not be removed from the system.

REQ-2: If the user selects the pencil icon next to the product name, then the user should be transferred to a pre-populated edit/add product form. The user may edit/add products, may review the edits or additions, and may confirm or verify or update the edits or additions to make them permanent.

REQ-3: If the user selects Add Product, then the user should be taken to a blank edit/add product form.

REQ-4: If the user selects the up arrow next to the column headers Product, UPC, or Active, then the associated column should be sorted in descending order by first letter.

REQ-5: If the user selects the down arrow next to the column headers Product, UPC, or Active, then the associated column should be sorted in ascending order by first letter.

REQ-6: If the user selects Next (when available), then the next 10 records should be displayed.

REQ-7: If the user selects Previous (when available), then the previous 10 entries should be displayed.

REQ-8: If the user selects First (when available), then the first 10 entries should be displayed.

REQ-9: If the user selects a new merchant from the drop down box and selects Submit, then the user should be transferred to the product list for the selected merchant.

REQ-10: If the user selects Add Product, then the user should be transferred to a list of all available products. The products that are currently being used by the Merchant should not be listed as being available to that particular Merchant. Alternatively, the products that are currently being used by the merchant may be listed but shown as unavailable.

Add Merchant Product.

In some embodiments, a virtual terminal may comprise an Add Merchant Product module. An Add Merchant Product module may allow an Administrator to add products to a merchant's accepted product list. This module may be located in eAdmin.

A user may select a product name in a Not Assigned box to be added. Once the user clicks on the product name, the product name should be moved to the Assigned box. Further, a user may select an item in a Assigned box to be removed. Once the user clicks on the product name, the product name should be moved to the Not Assigned box.

Other methods may be used to transfer items from one list or box to a different list or box. For example, double clicking on an item may move it to a different box. Alternatively, the item may be clicked and dragged to a different box. Alternatively, one or more items in a box may be selected, and then an arrow icon may be selected to move the items to a different box.

A graphical user interface module for Merchant Product List may satisfy the following requirements:

REQ-1: If the user selects a link (product) in the Assigned box, then that link (product) should be moved to the Not Assigned box. The product name shown on the screen may be linked to a database.

REQ-2: If the user selects a link (product) in the Not Assigned box, then that link (product) should move to the Assigned box.

REQ-3: If the user selects Return to Product Administration then the user should be transferred to the Merchant Product List module without adding any products.

REQ-4: If the user selects Save, the information should be saved, and they should return to the Merchant Product List module, which should reflect the saved changes. Alternatively, the user may select Save and then remain in the same module or in the same screen.

Security.

In some embodiments, a virtual terminal may have security measures to restrict access. In some embodiments, only connections from authorized IP addresses are allowed. In some embodiments, other security solutions such as RSA Secure IDs may be installed on each authorized computer.

Threshold Check.

In some embodiments, a virtual terminal may perform threshold checks before allowing a user to activate a product or generate a PIN for a product. A threshold check may determine if the maximum number of activations and/or generations for a user has been reached. The maximum number of activations and/or generations may be determined by a finance department.

Auditing.

In some embodiments, a virtual terminal may maintain an activity log of attempts to activate, deactivate, or generate a PIN for a product, the results of the attempts, and additional data associated with the attempts.

Data Encryption and Security.

Communication between the virtual terminal and the central processor may be encrypted and transferred using the interne, or telephones, or private communication lines, known by one of ordinary skill in the art. For example, public-key encryption or rolling codes may be used. Other security measures such as biometric identification of users may be implemented, for example voice recognition or fingerprint identification. The virtual terminal activity may be monitored for irregular activity that may indicate potential fraudulent use.

Alternative Methods of Data Storage.

The classic PIN comprises a series of numbers. As discussed above, alphabetic characters and other identification indicia are also contemplated. Characters may be read using optical character recognition (OCR) technology. Additionally, classic bar codes comprise printed bars that are readable by a bar code reader utilizing a laser scanning in a one-dimensional linear fashion. More advanced "bar codes" utilize a two-dimensional pixel geometry to incorporate data more densely than is possible using classic bar codes. OCR and bar code readers read visible printed indicia.

Alternatively, identification indicia (such as a PIN) may be stored without any visible printing. For example, a PIN may be recorded or "printed" on a magnetic stripe, or may be recorded on a writable smartcard using flash memory, or may be recorded on a writable RFID tag, or may be recorded using punched holes, or may be recorded using any data storage technology known in the art. Similarly, a PIN may be recorded in the hard drive of a laptop computer or in the flash memory of a mobile telephone.

Further, identification indicia (such as a PIN) may be remembered by the user without any permanent record on a tangible medium. For example, a user may receive a PIN verbally, and may commit the PIN to memory without creating any permanent record on a tangible medium. This type of user memorization is common for military top secret access codes.

The systems and methods, as disclosed herein, are directed to the problems stated above, as well as other problems that are present in conventional techniques. Any description of various products, methods, or apparatus and their attendant disadvantages described in the "Background of the Invention" is in no way intended to limit the scope of the invention, or to imply that invention dos not include some or all of the various elements of known products, methods and apparatus in one form or another. Indeed, various embodiments of the invention may be capable of overcoming some of the disadvantages noted in the "Background of the Invention," while still retaining some or all of the various elements of known products, methods, and apparatus in one form or another.

The present invention is not to be limited in scope by the specific exemplary embodiments described herein. Indeed, various modifications of the present invention, in addition to those described herein, will be apparent to those of ordinary skill in the art from the foregoing description and accompanying drawings.

What is claimed:

1. A system of processing stored value card transactions over a network, the system comprising:
   a merchant processor configured to:
      use as a virtual terminal such that a dedicated physical merchant terminal is unnecessary, wherein the virtual terminal configured to display a plurality of stored value card transaction options, which including at least one of the set consisting of stored value card activation, stored value card deactivation, personal identification number (PIN) generation, and account value insertion; and
      transmit a transaction request in response to selection of one of the stored value card transaction options by a user of the virtual terminal;
   a central processor configured to:
      receive over the network the transaction request from the merchant processor, wherein the transaction request having been initiated by a merchant selection from the plurality of stored value card transaction request options;
      determine which of the transaction request options was selected;
      determine that sufficient information to carry out the transaction request was provided;
      determine, based on information of the transaction request, whether the transaction request meets at least one authorization criteria by determining whether the merchant processor is authorized to request one of the stored value card transaction options;
      responsive to a determination that the transaction request does not meet the authorization criteria, transmit an error message to the merchant processor; and
      responsive to a determination that the transaction request meets the authorization criteria, transmit a confirmation message to the merchant processor and initiating the requested transaction.

2. The system according to claim 1 wherein the transaction request is a request to activate a stored value card, the transaction request comprises a stored value card serial number and a value to be associated with the stored value card provided by the user in response to prompts by the virtual terminal, and the central processor further configured to activate the stored value card and associate the value with the stored value card responsive to a determination that the transaction request meets the authorization criteria.

3. The system according to claim 2 wherein the determination of whether the transaction request meets the authorization criteria includes at least one of the set consisting of:
   determining by the central processor whether the stored value card has already been activated,
   determining by the central processor whether the merchant processor is authorized to request activation of the card, and
   determining by the central processor whether the stored value card serial number is valid.

4. The system according to claim 1 wherein the transaction request is a request to deactivate a stored value card, the transaction request comprises at least one of the set consisting of a stored value card serial number and a PIN provided by the user in response to prompts by the virtual terminal, and the central processor further configured to determine whether the stored value card is active, and deactivating the stored value card based on a determination by the central processor that the transaction request meets the authorization criteria.

5. The system according to claim 4 wherein the determination of whether the transaction request meets the authorization criteria includes at least one of the set consisting of:
   determining by the central processor whether the stored value card is active,
   determining by the central processor whether the merchant processor is authorized to request deactivation of the card, and
   determining by the central processor whether the at least one of the set consisting of a stored value card serial number and a PIN is valid.

6. The system according to claim 1 wherein the transaction request is a request to insert value into a pre-existing customer account with a provider of goods and services, the transaction request comprises a stored value card serial number, information sufficient to identify the pre-existing customer account, and an amount to be inserted into the pre-existing customer account provided by the user in response to prompts by the virtual terminal, and the central processor further configured to, responsive to a determination that the transaction request meets the authorization criteria, determine the provider of goods and services based on the information in the transaction request, and pass to the provider of goods or services a request to insert the amount into the pre-existing customer at the provider of goods or services.

7. The system according to claim 6 wherein the central processor determines whether the transaction request meets the authorization criteria comprises at least one determination of the set consisting of:
   whether the stored value card is active,
   whether the amount to be inserted exceeds a value associated with the stored value card, and
   whether the merchant processor is authorized to request value insertion.

* * * * *

UNITED STATES PATENT AND TRADEMARK OFFICE
CERTIFICATE OF CORRECTION

PATENT NO. : 8,489,478 B2
APPLICATION NO. : 12/798574
DATED : July 16, 2013
INVENTOR(S) : Michael Parlotto It is certified that error appears in the above-identified patent and that said Letters Patent is hereby corrected as shown below:

In the Specifications:

Column 5, Line 2, the word "an" should be changed to --a--

Column 6, Line 52, the word "a" should be omitted

Column 6, Line 59, the word "competed" should be changed to --completed--

Column 8, Line 32, the word "with" should be changed to --wish--

Column 12, Line 38, the word "per" should be omitted

Column 12, Line 55, the word "an" should be changed to --a--

Column 14, Line 43, the word "interne" should be changed to --internet--

Column 15, Line 17, the word "dos" should be changed to --does--

Signed and Sealed this
Third Day of September, 2013

Teresa Stanek Rea
*Acting Director of the United States Patent and Trademark Office*